United States Patent [19]

Takami

[11] Patent Number: 5,018,400
[45] Date of Patent: May 28, 1991

[54] CONTINUOUSLY VARIABLE TRACTION DRIVE SPEED CHANGER

[75] Inventor: Akira Takami, Himeji, Japan

[73] Assignee: Mitsubishi Denki Kabushiki Kaisha, Tokyo, Japan

[21] Appl. No.: 530,530

[22] Filed: May 30, 1990

[30] Foreign Application Priority Data

Jun. 2, 1989 [JP] Japan .................................. 1-141806

[51] Int. Cl.$^5$ ............................................. F16H 15/00
[52] U.S. Cl. ........................................ 74/198; 74/190
[58] Field of Search ..................... 74/190, 190.5, 209, 74/198, 199

[56] References Cited

U.S. PATENT DOCUMENTS

| 4,726,244 | 2/1988 | de Pencier | 74/200 |
| 4,738,164 | 4/1988 | Kaneyuki | 74/796 |
| 4,751,854 | 6/1988 | Sakai et al. | 74/796 |

FOREIGN PATENT DOCUMENTS 349346  5/1905  France .................................. 74/199

OTHER PUBLICATIONS

"Traction Drives Roll Up Impressive Gains", *Machine Design*, 1985, pp. 68–75.

Primary Examiner—Allan D. Herrmann
Assistant Examiner—David W. Laub
Attorney, Agent, or Firm—Sughrue, Mion, Zinn, Macpeak and Seas

[57] ABSTRACT

A continuously variable traction drive speed changer comprising a main frame (50) and a pair of rolling wheel assemblies (40a, 40b). Each rolling wheel assembly (40a, 40b) includes a coupling wheel (20) which is a bevel gear, a rolling wheel (10) having a bevel gear (12) meshing with the coupling wheel and a pivot shaft member (30) rotatably supporting the coupling wheel and the rolling wheel. The rolling wheel has an outer circumferential surface defined by a rotated involute curve, and the pivot shaft member is rotatably supported from the main frame (50) with respect to the circumferential direction of the coupling wheel. The rolling wheel assemblies (40a, 40b) are mounted in parallel to each other to the main frame (50) in such an arrangement that axes of the coupling wheels (20) are parallel to each other, and axes of the rolling wheels (10) are in a plane containing the axes of the coupling wheels (20) and perpendicular to the axes of the coupling wheels (20), and that the rolling wheels (10) are in contact with each other at outer circumferences. The speed changer also comprises an input shaft (60a) connected to the coupling wheel of one of the rolling wheel assemblies, an output shaft (60b) connected to the coupling wheel of the other of the rolling wheel assemblies, and a contact pressure applying member (80a) biasing the axes of the rolling wheels for rotating the pivot shaft members in the circumferential direction of the coupling wheel toward respective contact portions.

1 Claim, 6 Drawing Sheets

CONTINUOUSLY VARIABLE TRACTION DRIVE SPEED CHANGER

BACKGROUND OF THE INVENTION

This invention relates to a continuously variable traction drive speed changer utilizing a rolling wheel.

Figure 1:
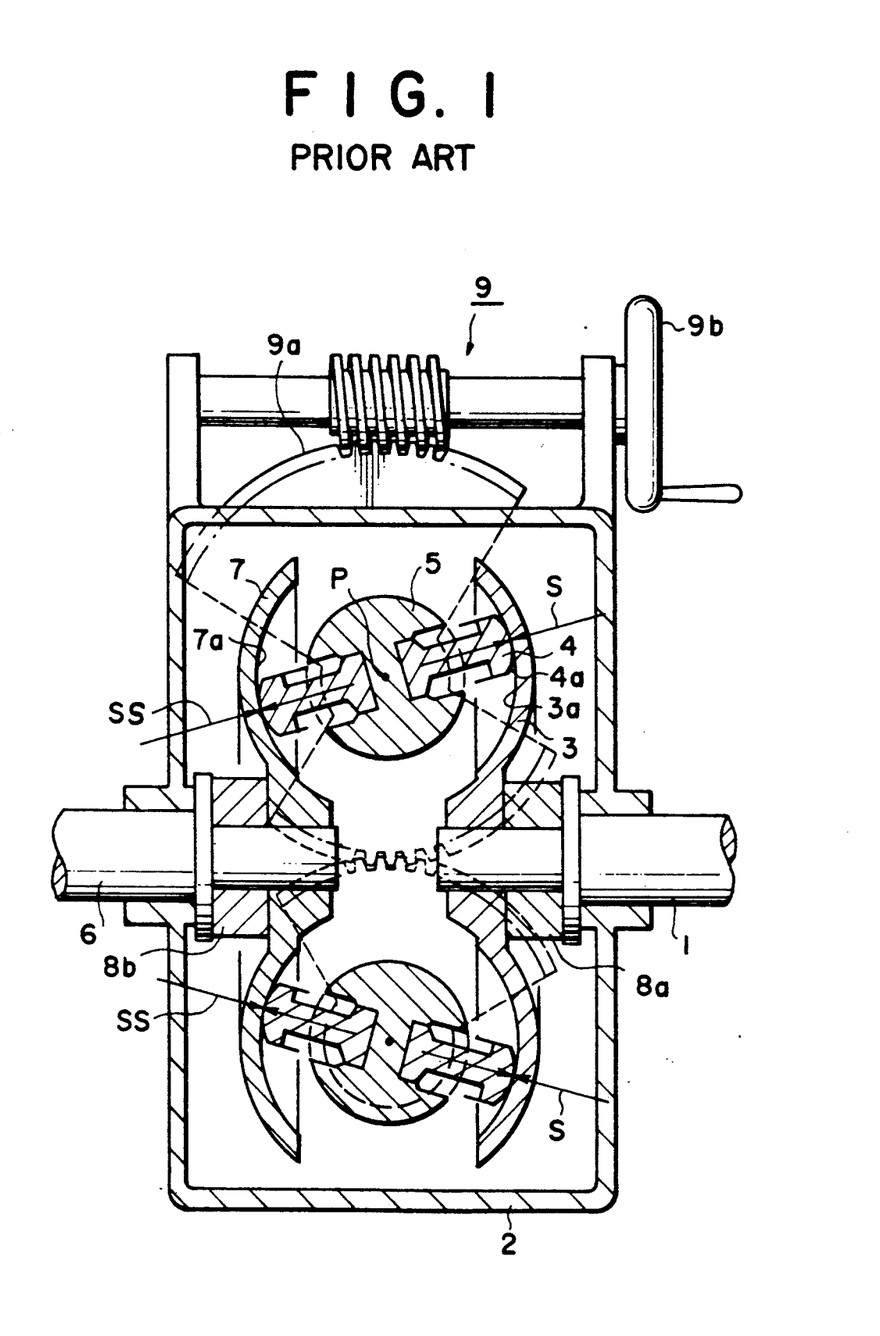
FIG. 1 is a sectional view illustrating a conventional continously variable traction drive speed changer.

One example of a conventional traction drive rotary motion transmission mechanism for a continuous variable speed changer is the troidal-type. The structure of one typical example will be explained in conjunction with FIG. 1, which is a sectional view illustrating the continuously variable speed changer of this kind. In FIG. 1, 1 indicates a main drive shaft rotatably supported by the main frame 2 and connected to an external main drive unit (not shown). 3 is a main rolling wheel secured on the main drive shaft 1 for rotation therewith, the main rolling wheel 3 having formed therein a rolling surface 3a defined by a continuous circumferential groove of an arcuated cross section. 4 is an intermediate rolling wheel for transmitting the rotational drive force of the main rolling wheel 3 to a follower rolling wheel which will be described later. The intermediate rolling wheel 4 has formed therein a rolling surface 4a defined by a continuous circumferential ridge of an arcuated cross section and rotatably supported by an intermediate rolling wheel pivot shaft 5. 6 is a follower shaft connected to an external follower unit (not shown), and the follower shaft 6 is rotatably held with respect to the main frame 2. 7 is a follower rolling wheel for transmitting the rotational force on the main rolling wheel 3 to the follower shaft 6, the follower rolling wheel 7 having formed therein a rolling surface 7a defined by a continuous circumferential groove of an arcuated cross section. 8a is a contact pressure means for bringing the rolling surface 3a and the rolling surface 4a into contact under a predetermined contact pressure on a line S of action of the contact pressure, and 8b is a contact pressure means for bringing the rolling surface 7a and the rolling surface 4a into contact under a predetermined pressure on a line SS of action of the contact pressure. 9 is a speed changing means for the rotary rocking motion of the intermediate rolling wheel pivot shaft 5 about a point P to tilt the intermediate rolling wheel 4, so that rolling surface contacting regions on the contact pressure acting lines S and SS can be shifted. This speed changing means 9 is connected to the intermediate rolling wheel pivot shaft 5 through the gear 9a.

The operation of the conventional traction drive speed changer will now be described. When the unillustrated external main drive unit rotates the main drive shaft 1 and the main rolling wheel 3, the main rolling wheel 3 drives the intermediate rolling wheel 4 due to the friction between the rolling surfaces 3a and 4a. The rotation of the intermediate rolling wheel 4 causes the follower rolling wheel 7 to be driven due to the friction between the rolling surfaces 4a and 7a. Thus, the rotational force on the main drive shaft 1 is transmitted to the driven shaft 6. The speed changing operation of the conventional speed changer as above described is achieved by operating a speed changing means 9 including a handle 9b. That is, when the handle 9b is actuated to shift, through a sector gear 9a, the position of the points of contact between the rolling surface 3a of the main rolling wheel 3 and the rolling surface 4a of the intermediate rolling wheel 4 as well as the rolling surface 4a of the intermediate rolling wheel 4 and the rolling surface 7a of the follower rolling wheel 7, the effective diameter of the main rolling wheel 3 and the effective diameter of the follower rolling wheel 7 are changed, thereby achieving the speed changing.

The continuously variable traction speed changers in general including the above described conventional arrangement are operated with the following two fundamental requirements. The first of the requirements is that a contact pressure should be exerted at the rolling surface contact area by any contacting pressure generating means so that a friction is provided between the rolling wheels in pair, and the second requirement is that an operational force is applied to the rolling surface contact area by any speed changing means so that the contact area is shifted. The contact pressure should have a magnitude that provides the necessary frictional force necessary for transmitting torque at each time point and that is sufficient. An excess amount of contact pressure is rather disadvantageous in that it provides friction losses which are useless in power transmission. Therefore, it is necessary to decrease such excess contact pressure in order to ideally increase the transmission efficiency of the apparatus. Also, the above operational force is important in determining the control function of the apparatus, and if this operational force can be varied by any suitable speed changing means in relation to the transmission torque at each time point, an ideal continuously variable speed changing function results in which the transmission speed changing ratio is automatically controlled in accordance with the transmission torque.

However, if the ideal function as just discussed above is to be obtained with the conventional technique, it is necessary to further additionally provide special measures to each of the contact pressure generating mechanism and the speed changing mechanism.

SUMMARY OF THE INVENTION

Accordingly, one of the objects of the present invention is to provide a continuously variable traction drive speed changer free from the above discussed problem of the conventional arrangement.

Another object of the present invention is to provide a continuously variable traction drive speed changer with a self-contained, mechanical automatic control mechanism.

A further object of the present invention is to provide a continuously variable traction drive speed changer exhibiting a transmission efficiency higher than that of the coventional design.

Still another object of the present invention is to provide a continuously variable traction drive speed changer of a simple structure.

With the above objects, in view, the continuously variable traction drive speed changer of the present invention comprises a main frame and a pair of rolling wheel assemblies. Each rolling wheel assembly includes a coupling wheel which is a bevel gear, a rolling wheel having a bevel gear meshing with the coupling wheel and a pivot shaft member rotatably supporting the coupling wheel and the rolling wheel. The rolling wheel has an outer circumferential surface defined by a rotated involute curve, and the pivot shaft member is rotatably supported from the main frame with respect to the circumferential direction of the coupling wheel. The rolling wheel assemblies are mounted in parallel to each other to the main frame in such an arrangement that axes of the coupling wheels are parallel to each other, and axes of the rolling wheels are in a plane containing the axes of the coupling wheels and perpendicular to the axes of the coupling wheels, and that the rolling wheels are in contact to each other at their outer circumferences. The speed changer also comprises an input shaft connected to the coupling wheel of one of the rolling wheel assemblies, an output shaft connected to the coupling wheel of the other of the rolling wheel assemblies, and a contact pressure applying member biasing the axes of the rolling wheels for rotating the pivot shaft members in the circumferential direction of the coupling wheel toward respective contact portions.

BRIEF DESCRIPTION OF THE DRAWINGS

The present invention will become more readily apparent from the following detailed description of the preferred embodiment of the present invention taken in conjunctin with the accompanying drawings, in which.

DESCRIPTION OF THE PREFERRED EMBODIMENTS

One embodiment of the present invention will now be described in conjunction with FIGS. 2 to 7, in which the continuously variable traction drive speed changer of the present invention comprises a pair of rolling wheel assemblies 40 (40a and 40b) each having a rolling wheel 10, a coupling wheel 20, and a pivot shaft member 30 for rotatably supporting the rolling wheel 10 and the coupling wheel 20. The rolling wheel assemblies 40 are rotatably supported by a housing 50. The rolling wheel 10 has a rolling surface 11 on the outer circumference thereof, a bevel gear 12 concentric with the rolling surface 11 of the rolling wheel 10 and a bearing 13. The coupling wheel 20 has a bevel gear 21 which is in mesh with the bevel gear 12 of the rolling wheel 10 and a bearing 22. The pivot shaft member 30 comprises a rolling wheel support shaft 31 and a coupling wheel support shaft 32 and has a substantially T-shaped configuration with one end of the rolling wheel support shaft 31 integrally secured to the midpoint of the coupling wheel support shaft 32 so that they extend perpendicularly to each other. The pivot shaft member 30 rotatably supports the rolling wheel 10 at its support shaft 31 through the bearing 13, and the coupling wheel 20 at its support shaft 32 through the bearing 22. The housing 50 rotatably supports the coupling wheel support shaft 32 through bearings 51 and 52, so that each of the rolling wheel assemblies 40 is rotatable about the axis of the support shaft 32.

Figure 4:
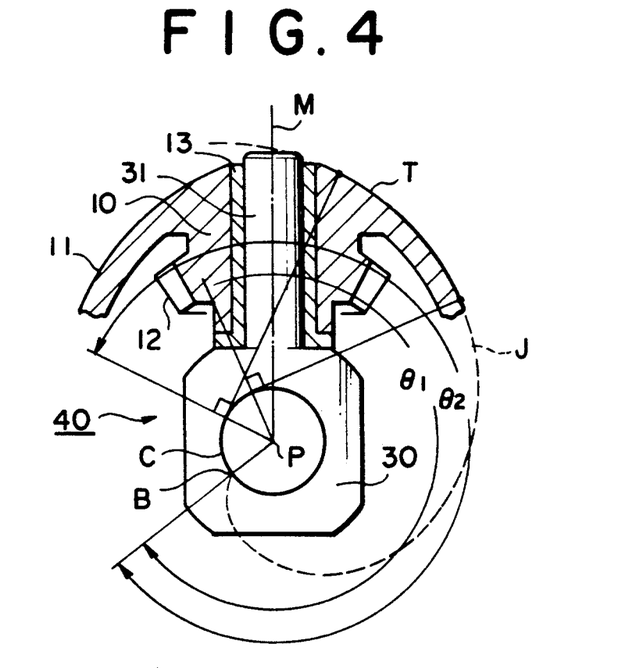
FIG. 4 is a sectional view of the rolling wheel assembly useful for explaining its configuration.

The description will now be made as to the configuration of the rolling surface 11 of the rolling wheel 10 in conjunction with FIG. 4. In FIG. 4, P indicates the point through which the axis of the coupling wheel support shaft 32 passes, M indicates the axis of the rolling wheel support shaft 31, T indicates the contour of the rolling surface 11, C indictes the circle of a predetermined radius about the point P, and J indicates one portion of the involute curve depicted by using the circle C as the base circle. As illustrated in FIG. 4, the configuration of the rolling surface 11 can be defined as a curved surface of a solid of revolution obtained by rotating, one complete rotation about the axis M of the rolling wheel support shaft 31, a predetermined continuous section, which is a curve section T of the involute curve J between the points at angles $\theta_1$ and $\theta_2$ from the starting point of the involute curve J based on the base circle C of the predetermined diameter having the center at the point P. Therefore, the contours of the rolling surface 11 appearing at two points on the section of the rolling wheel 10 are in a mirror-image relationship to each other with respect to the axis M of the rolling wheel support shaft 31.

Figure 2:
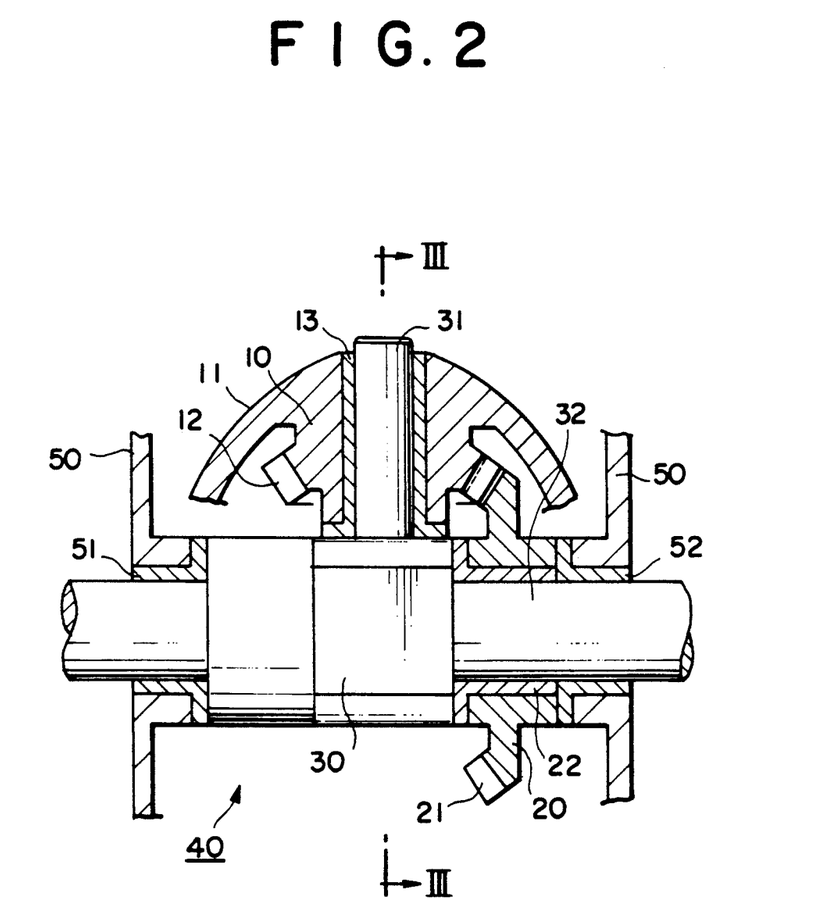
FIG. 2 is a sectional view illustrating the rolling wheel assembly of the present invention.
Figure 3:
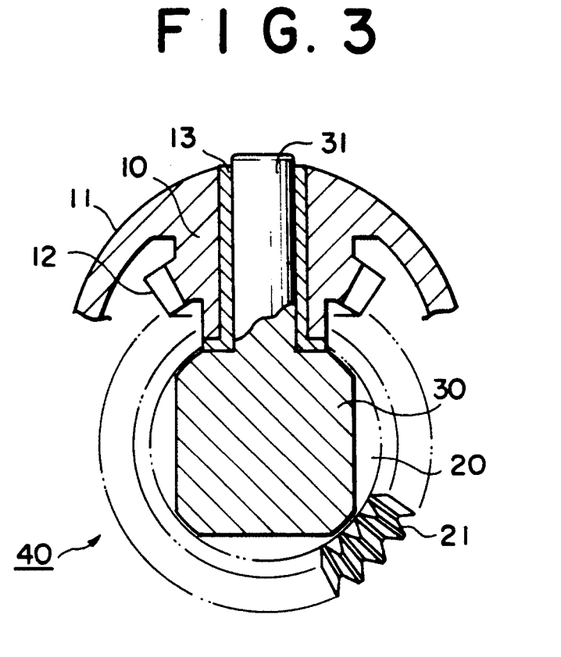
FIG. 3 is a sectional view of the rolling wheel assembly taken along line III—III of FIG. 2.

The operation of the rolling wheel assembly 40 will now be described. When either one of the rolling wheel 10 and the coupling wheel 20 is caused to drive the other, these wheels are brought into a state in which a torque according to the ratio of the numbers of the teeth of the bevel gears 12 and 21 acts mutually thereon about each pivot axis. Also, a state is established in which a torque equal to the torque acting on the coupling wheel 20 about the axis of the coupling wheel pivot shaft 32 is exerted upon the rolling wheel 10. Under these circumstances, when a reaction torque which is in balance with the torque about the coupling wheel pivot shaft 32 is applied to the rolling wheel 10 by any suitable manner, and when the entire rolling wheel assembly 40 is held at an arbitrary position so that it is not rotated about the axis of the coupling wheel pivot shaft 32, then the rolling wheel 10 and the coupling wheel 20 rotate about their respective pivot axes at the rotational speed in accordance with the reverse ratio of the ratio of teeth number of the bevel gears, thus transmitting the rotational power therebetween. In other words, when the rolling wheel 10 and the coupling wheel 20 are transmitting the rotational power, a torque equal to the transmission torque on the coupling wheel 20 side is acting on the rolling wheel 10 as the torque about the axis of the coupling wheel pivot shaft 32. This operational mode is one of the features of the rolling wheel assembly of the present invention.

Figure 5:
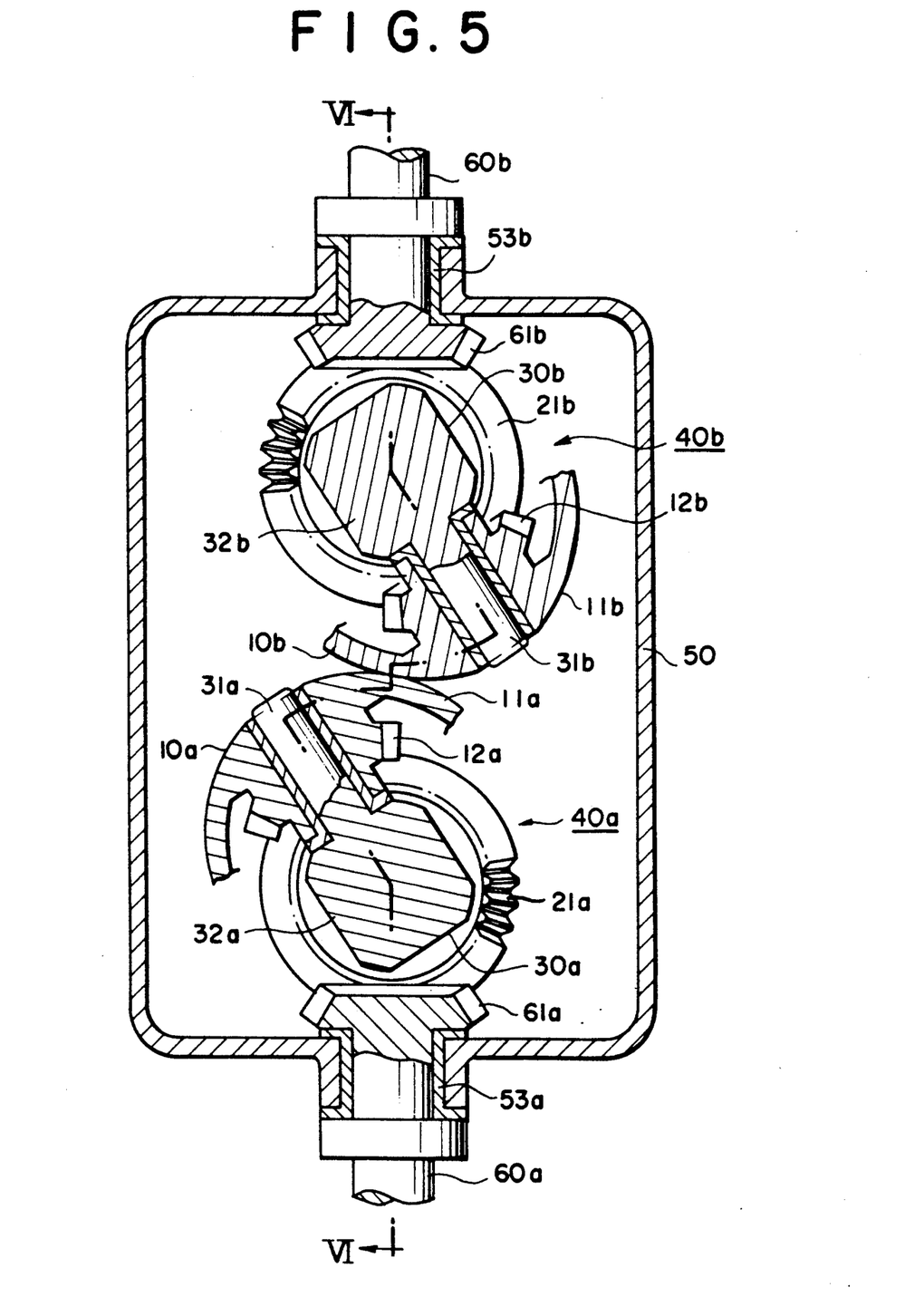
FIG. 5 is a longitudinal sectional view illustrating the continuously variable traction drive speed changer of the present invention.
Figure 6:
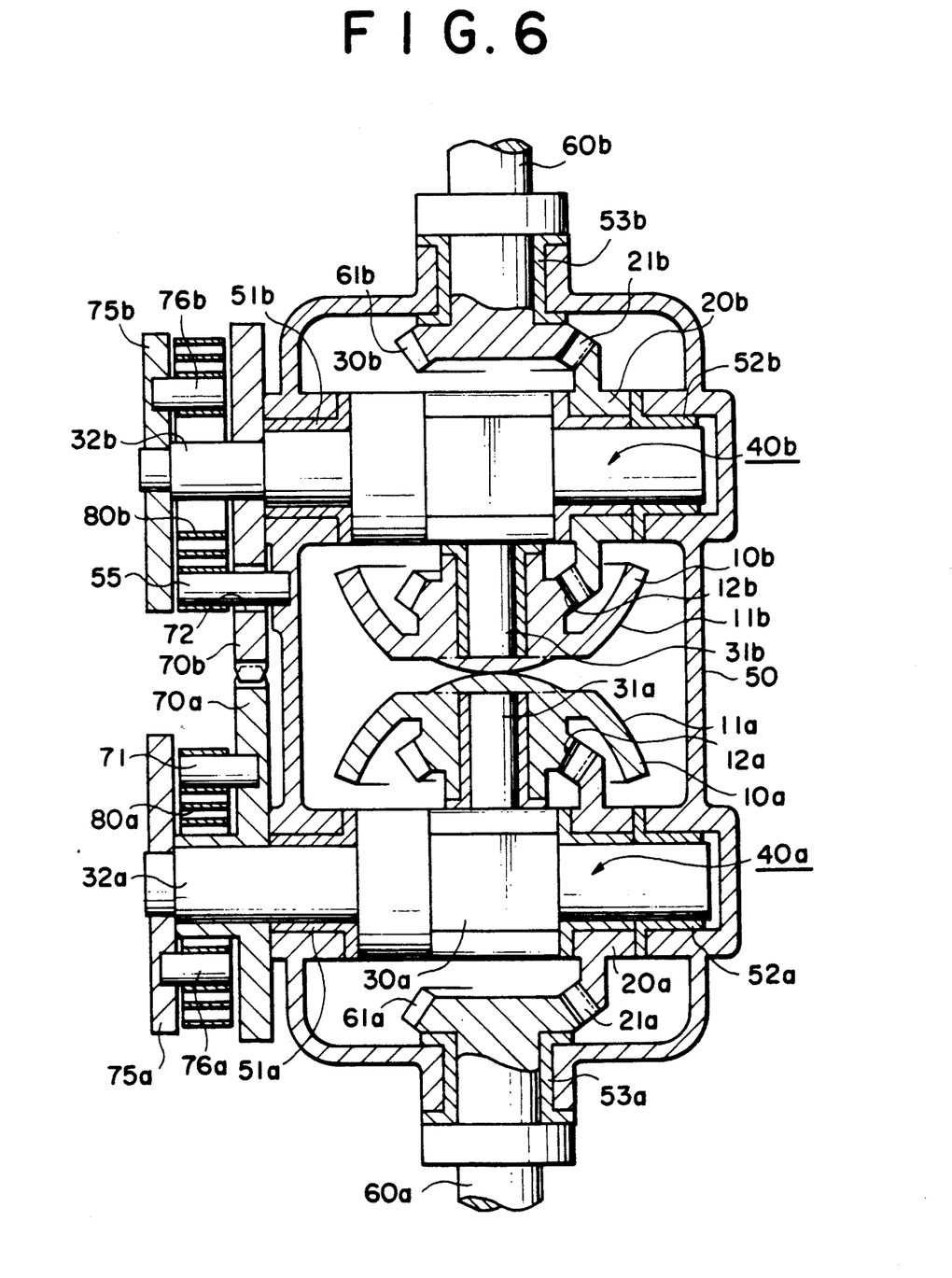
FIG. 6 is a sectional view taken along line VI—VI of FIG. 5.
Figure 7:
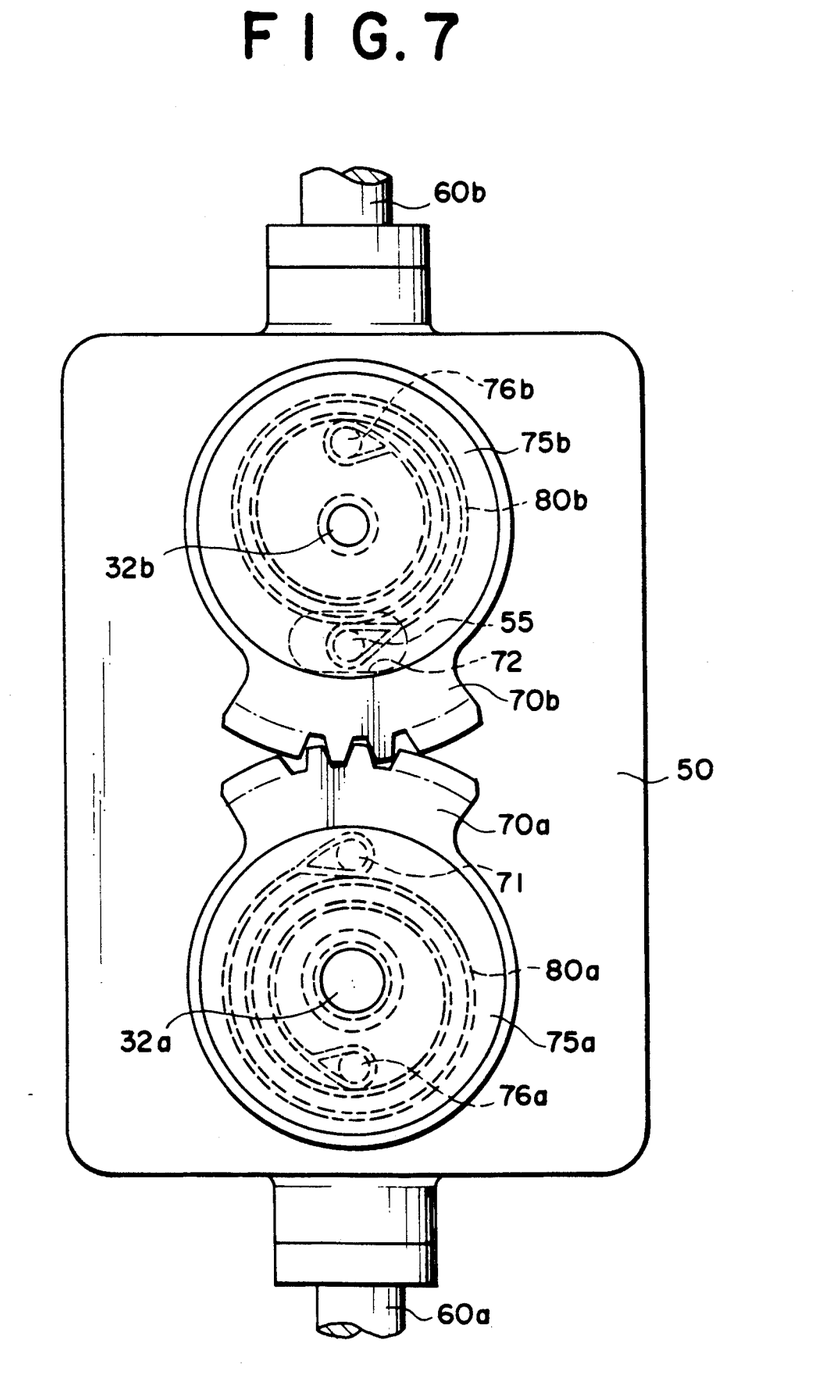
FIG. 7 is a side view of the continuously variable traction drive speed changer of the present invention.

The description will now be made in detail, in conjunction with FIGS. 5 to 7, as to a continuously variable traction drive speed changer comprising a pair of the above rolling wheel assemblies. In FIGS. 5 to 7, the continuously variable traction drive speed changer comprises a housing 50 which is an outer frame, within which an input side rolling wheel assembly 40a is rotatably supported by the bearing means 51a and 52a mounted to the housing 50 and an output side rolling wheel assembly 40b is rotatably supported by the bearing means 51b and 52b mounted to the housing 50. Although these rolling wheel assemblies 40a and 40b correspond to the rolling wheel assembly 40 illustrated in FIGS. 2 and 3, they are indicated in these figures by the corresponding reference numerals used in FIGS. 2 and 3 with suffixes a or b indicating the components on the input side or the output side, respectively. That is, this continuously variable traction speed changer is constructed by mounting the rolling wheel assembly 40a on the input side and the rolling wheel assembly 40b on the output side in such an arrangement that the axes of their coupling wheel pivot shafts 32a and 32b are in parallel to each other, that the axes of the rolling wheels 10a and 10b are in a plane containing and perpendicular to the axes of the coupling wheel pivot shafts 32a and 32b, and that the rolling surfaces 11a and 11b are in contact with each other. One end of each of the coupling wheel pivot shafts 32a and 32b projects outward passing through one side portion of the housing 50. A bevel gear 61a is provided at a tip of an input shaft 60a, and this bevel gear 61a is supported circumferentially rotatably but axially immovably with respect to the housing 50 by a bearing means 53a mounted to the housing 50. Similarly, a bevel gear 61b is provided at a tip of an input shaft 60b, and this bevel gear 61b is supported circumferentially rotatably but axially immovably with respect to the housing 50 by a bearing means 53b mounted to the housing 50. A contact pressure gear 70a is loosely fitted over a projection portion of the coupling wheel pivot shaft 32a and a pin 71 for connecting a contact pressure spring which will be described later is rigidly mounted. A contact pressure ring 75a is integrally secured at a projecting end of the coupling wheel pivot shaft 32a, on which a pin 76a for connecting to the contact pressure spring which will be described later is connected is planted. A speed changing gear 70b is in mesh with the contact pressure gear 70a, and a positioning hole 72 through which a pin for supporting a speed changing spring which will be described later extends. A speed changing ring 75b is integrally secured at the projecting end of the coupling wheel pivot shaft 32b, and a pin 76b connected to a speed changing spring which will be described later is planted. A pin 55, which is disposed on the housing 50 for supporting the speed changing spring, is disposed to extend through the positioning hole 72 of the speed changing gear 70b, so that the range of the rocking motion of the speed changing gear 70b is limited by the pin 55. A spiral contact pressure spring 80a is disposed between the pin 71 and the pin 76a, and a spiral contact pressure spring 80b is disposed between the pin 55 and the pin 76b.

The operation of the continuously variable traction drive speed changer of the present invention as above described will now be described. The contact state established between the rolling surface 11a and the rolling surface 11b is quite an equivalent to a meshing mechanism between two involute gears, and each of the rolling wheel 10a and the rolling wheel 10b corresponds to one tooth of each of imaginary gears having the centers at the coupling wheel pivot shaft 32a and the coupling wheel pivot shaft 32b and in a meshing state. This can be easily understood from the foregoing description in conjunction with FIG. 4.

At first, the function of the contact pressure spring 80a in such the mechanism will be described. The contact pressure spring 80a exterts on the contact pressure ring 75a a clockwise torsional spring force from the side of the contact pressure gear 70a. This spring force is transmitted from the contact pressure ring 75a in the same direction to the rolling surface 11a of the rolling wheel 10a through the coupling wheel pivot shaft 32a and the rolling wheel pivot shaft 31a. On the other hand, a counterclockwise torsional spring force applied to the contact pressure gear 70a is transmitted to the speed changing gear 70b after reversed into the clockwise direction to the rolling surface 11b of the rolling wheel 10b through the coupling wheel pivot shaft 32b and the rolling wheel pivot shaft 31b. Thus, the function of the contact pressure spring 80a is balanced within a closed loop passing through the contact point on the rolling surface, always applying a substantially constant contact pressure to the contacting point between the rolling surface 11a and the rolling surface 11b as illustrated in FIG. 5.

As illustrated in FIG. 7, the speed changing spring 80b, whose function will now be described, exerts a clockwise torsional spring force onto the speed changing gear 70b and the coupling wheel pivot shaft 32b integral with the speed changing gear 70b from the pin 55 secured to the housing 50. A counterclockwise torsional spring force is applied to the coupling wheel pivot shaft 32a from the coupling wheel pivot shaft 32b through the engaged rolling wheel 10a and the rolling wheel 10b as the imaginary gears which have previously described as an equivalent of the meshing mechanism of two involute gears. Since the contact pressure gear 70a directly meshing with the speed changing gear 70b is loosely placed over the coupling wheel pivot shaft 32a, the contact pressure gear 70a provides no direct effect on the coupling wheel pivot shaft 32a. Due to the above-described action of the speed changing spring 80b, the action against the torsional spring force can be deemed as a sum of the counterclockwise torsional force on the coupling wheel pivot shaft 32b and the clockwise torsional force on the coupling wheel pivot shaft 32a, which corresponds to the torsional force of a component proportional to a sum of the input rotational force on the input shaft 60a and the load rotational force on the output shaft 60b.

In FIGS. 5 and 6, the relationship of the torque acting between the input shaft 60a and the coupling wheel 20a is fixed by the ratio of the teeth numbers of the bevel gears in a manner similar to that the relationship of the torque acting between the rolling wheel 10a and the coupling wheel 20a is fixed by the ratio of the numbers of the teeth of the bevel gears. This is also true on the output side and the relationship of the torque acting between the output shaft 60b and the coupling wheel 20b is fixed by the ratio of the numbers of the teeth of the bevel gears. Since one feature of the rolling wheel assembly of the present invention is that a torque equal to the torque acted by the coupling wheel 20a acts upon the coupling wheel pivot shaft 32a and, similarly, a torque equal to the torque acted by the coupling wheel 20b acts upon the coupling wheel pivot shaft 32b, what can be deemed as a sum of the torsional force on the coupling wheel pivot shaft 32b and the torsional force on the coupling wheel pivot shaft 32a is exactly the component proportional to a sum of the input torque on the input shaft 60a and the load torque on the output shaft 60b. Thus, the torsional spring force of the speed changing spring 80b is acting in direction relation to the sum of the input torque and the output torque.

In FIGS. 5 to 7, when the input shaft 60a is rotated clockwise as seen from the bottom in the figures, this rotation is transmitted through the meshing bevel gears 61a, 21a and 12a to cause the rolling wheel 10a to be rotated about the rolling wheel pivot shaft 31a, so that the transmission of the rotation are to be achieved due to the friction or traction drive between the rolling surface 11a of the rolling wheel 10a and the rolling surface 11b of the rolling wheel 10b. Since the contacting pressure at least by the contacting pressure spring 80a is applied at the contact point between the rolling surface 11a and the rolling surface 11b, a frictional power transmission can be carried out to cause the rolling wheel 10b to rotate about the rolling wheel pivot shaft 31b. This rotation is transmitted through the meshing bevel gears 12b, 21b and 61b to the output shaft 60b as a counterclockwise rotation of the output shaft 60b as viewed from the bottom of the figures.

In this transmission route, four steps of gear transmission and one step of friction transmission are involved. Since the gear transmission mechanisms have respective fixed speed ratios, any speed change between the input shaft 60a and the output shaft 60b can be only achieved by changing the speed ratio of the single friction transmission step or the change in the ratio of rotations of the rolling wheel 10a and the rolling wheel 10b. The rotation ratio of the rolling wheel 10a and the rolling wheel 10b is related to the position at which the rolling surfaces of the rolling wheels are brought into contact and determined by the ratio between the length of the legs of the lines perpendicular to the axes of the respective rolling wheel pivot shafts from the contact point. In this embodiment, in FIG. 7, the rotation ratio between the input shaft and the output shaft is at its maximum when the speed change gear 70b is rotated clockwise and its further clockwise rotation is limited by the pin 55 engaging one end of the positioning hole 72, and the rotation ratio between the input shaft and the output shaft is at its maximum when the speed change gear 70b is rotated counterclockwise and its further counterclockwise rotation is limited by the pin 55 engaging the other end of the positioning hole 72. When the load torque of the output shaft 60b is small, the sum of the load torque and the input torque balances with a relatively small force provided in accordance with the torsional spring characteristics of the speed changing spring 80b, and as the load torque increases, the sum of this load torque and the input torque balances with a larger force provided by the speed changing spring 80b increased in accordance with the spring characteristics. In other words, the point at which the above-mentioned sum or the torques balance shifts along the torsional spring characteristics curve. For example, when the load torque is increased to a point close to the maximum value within the set range, the speed changing spring 80b is wound and the speed changing gear 70b is rotated counterclockwise, and the positional relationship between the rolling wheel 10a and the rolling wheel 10b shifts to the position in which the rolling wheel pivot shaft 31a is rotated clockwise, so that the rotational ratio between the input and the output shafts becomes close to the minimum value, whereby the output shaft 60b is speed-reduced. During the above operation, the contact pressure necessary for the traction driving is sufficiently but not excessively supplied not only by the contact pressure spring 80a but also directly by the acting torque of the coupling wheel in accordance with the transmission torque.

As has been described, the continuously variable traction drive speed changer of the present invention comprises a main frame, a pair of rolling wheel assemblies each including a coupling wheel which is a bevel gear, a rolling wheel having a bevel gear meshing with the coupling wheel and a pivot shaft member rotatably supporting the coupling wheel and the rolling wheel, the rolling wheel having an outer circumferential surface defined by a rotated involute curve, and the pivot shaft member being rotatably supported from the main frame with respect to the circumferential direction of the coupling wheel, the pair of rolling wheel assemblies being mounted in parallel to each other to the main frame in such an arrangement that axes of the coupling wheels are parallel to each other, and axes of the rolling wheels are in a plane containing the axes of the coupling wheels and perpendicular to the axes of the coupling wheels, and that the rolling wheels are in contact to each other at outer circumference, an input shaft connected to the coupling wheel of one of the rolling wheel assemblies, an output shaft connected to the coupling wheel of the other of the rolling wheel assemblies, and a contact pressure applying member biasing the axes of the rolling wheels for rotating the pivot shaft members in the circumferential direction of the coupling wheel toward respective contact portions.

Therefore, when the coupling wheel of the rolling wheel assembly on the input side is driven by an input torque, the coupling wheel drives the rolling wheel through the bevel gears, and this rolling wheel drives the rolling wheel of the rolling wheel assembly on the output side by friction, so that the coupling wheel on the output side is driven through the bevel gear to provide an output torque. When the load torque on the output shaft is increased or decreased, the rolling wheel on the output side is rocked along the circumferential direction of the coupling wheel in accordance with the biasing force of the contact pressure generating member to change the rotational ratio or speed ratio between the input side rolling wheel and the output side rolling wheel.

Also, the rolling wheel assembly directly acts on the rolling wheel with its force correlated with the transmission torque as the contact pressure on the rolling transmission surface. Therefore, with the continuously variable traction drive speed changer of the present invention, necessary contact pressure at any particular time point can automatically be always ensured in accordance with the instantaneous transmission torque value, and the speed changing ratio at each time point can be automatically selected in a continuous, stepless manner in accordance with the changing transmission torque value.

Therefore, according to the present invention, the automatic control function of the speed changer can be provided by a purely mechanical measure self-contained in the apparatus. Also, a transmission efficiency higher than that of the conventional speed changer is achieved with a structure simpler than that of the conventional design.

What is claimed is:

1. A continuously variable traction drive speed changer comprising:
   a main frame;
   a pair of rolling wheel assemblies each including a coupling wheel which is a bevel gear, a rolling wheel having a bevel gear meshing with said coupling wheel and a pivot shaft member rotatably supporting said coupling wheel and said rolling wheel, said rolling wheel having an outer circumferential surface defined by a rotated involute curve, and said pivot shaft member being rotatably supported from said main frame with respect to the circumferential direction of said coupling wheel;
   said pair of rolling wheel assemblies being mounted in parallel to each other to said main frame in such an arrangement that axes of said coupling wheels are parallel to each other, and axes of said rolling wheels are in a plane containing said axes of said coupling wheels and perpendicular to said axes of said coupling wheels, and that said rolling wheels are in contact with each other at outer circumferences thereof;
an input shaft connected to said coupling wheel of one of said rolling wheel assemblies;
an output shaft connected to said coupling wheel of the other of said rolling wheel assemblies; and
a contact pressure applying member biasing said axes of said rolling wheels for rotating said pivot shaft members in the circumferential direction of said coupling wheel toward respective contact portions.

* * * * *